United States Patent [19]
Baek et al.

[11] Patent Number: 5,278,578
[45] Date of Patent: Jan. 11, 1994

[54] THERMAL PRINTER CAPABLE OF USING DUMMY LINES TO PREVENT BANDING

[75] Inventors: Seung-Ho Baek, Pittsford; Thomas A. Mackin, Hamlin, both of N.Y.

[73] Assignee: Eastman Kodak Company, Rochester, N.Y.

[21] Appl. No.: 749,381

[22] Filed: Aug. 23, 1991

Related U.S. Application Data

[63] Continuation-in-part of Ser. No. 451,655, Dec. 18, 1989, Pat. No. 5,164,742.

[51] Int. Cl.$^5$ .............................................. G01D 15/10
[52] U.S. Cl. ...................................... 346/76 L; 346/108
[58] Field of Search .. 358/298; 346/107 R; 346/76 L; 346/108

[56] References Cited

U.S. PATENT DOCUMENTS

| | | | |
|---|---|---|---|
| 4,698,691 | 10/1987 | Suzuki et al. | 358/283 |
| 4,734,868 | 3/1988 | De Lacy | 364/519 |
| 4,804,975 | 2/1989 | Yip | 346/76 L |
| 4,916,638 | 4/1990 | Haselby et al. | 346/154 X |
| 4,989,018 | 1/1991 | Tsuchiya et al. | 358/298 X |
| 5,164,742 | 11/1992 | Baek et al. | 346/76 L |
| 5,168,288 | 12/1992 | Baek et al. | 346/76 L |

*Primary Examiner*—A. T. Grimley
*Assistant Examiner*—Nestor R. Ramirez
*Attorney, Agent, or Firm*—Robert L. Randall

[57] ABSTRACT

A thermal printer is disclosed which is a adapted to form an image on a thermal print medium of a type in which a donor element transfers dye to a receiver element upon receipt of a sufficient amount of thermal energy. The printer includes a plurality of diode lasers which can be individually modulated to supply energy to selected dots on the medium in accordance with an information signal. The print head of the printer includes a fiber optic array having a plurality of optical fibers coupled to the diode lasers. The thermal print medium is supported on a rotatable drum, and the fiber optic array is movable relative to the drum. In order to prevent banding in an image produced on the print medium, the two outside fibers in the array are used for preheating and postheating of inner scan lines. The printer is particularly well adapted for use as a proof printer for half-tone reproductions of images. The printer suppresses any visual artifacts that are resultant from interactions of selected patterns of half-tone dots and incremental dots which are used by the printer to generate an image. The printer does not however mask any artifacts that are resultant from interaction of image components (such as picket fences) with a selected pattern of half-tone dots.

12 Claims, 8 Drawing Sheets

THERMAL PRINTER CAPABLE OF USING DUMMY LINES TO PREVENT BANDING

CROSS REFERENCE TO RELATED PATENT APPLICATIONS

The present application is a Continuation-in-Part of U.S. patent application Ser. No. 451,655 now U.S. Pat. No. 5,164,742, entitled "Thermal Printer", filed Dec. 18, 1989, which has common inventorship, and has a common assignee with the present patent application.

FIELD OF THE INVENTION

This invention relates generally to a thermal printer for printing half-tone proof images, and more particularly, to minimizing image artifacts in the proofs.

BACKGROUND OF THE INVENTION

When graphical information, such as photographs or artwork, is printed in a typical publication, a half-tone printing process is used. Half-tone printing is capable of producing a very high fidelity reproduction of a photograph or artwork if various printing parameters are chosen correctly. However, the half-tone printing process can also introduce some undesirable image distortions when printing parameters are incorrectly chosen. For example, some repetitive patterns in an image (such as a picket fence) may beat against a particular pattern of dots selected for the half-tone process. This causes objectionable repetitive variations in image density which are known as moire patterns or fringes.

In the publication field, the selection of photographs and artwork for a publication has heretofore been done by people who are indirectly involved with the process of half-tone printing. Typically, the selected images are sent to a printer so that a proof sheet can be generated. A proof sheet is made on a press which generates a half-tone reproduction of the selected images. The proof sheets, in half-tone format, are returned to the image selectors. The image selectors then determine whether or not their initially selected images are indeed suitable for the desired publication.

If the images are not suitable, another round of proof sheets may be generated using different images or different half-tone printing parameters. This iterative process can be very costly and time consuming. In order to reduce the costs of generating half-tone proofs, various forms of proof presses have been devised and used. Typically, a proof press is smaller and less costly to operate than a full sized printing press. A proof press is designed so that half-tone printing can be performed in a cost-effective manner for a small number of proof sheets.

However, in spite of the improved cost effectiveness of using a proof press, there remain some substantial problems in getting images selected and ready for inclusion in a publication. For, example, a proof press is a complex and expensive piece of equipment. Consequently, proof presses are typically found only in print shops. Thus a person selecting images is still required to go through the cumbersome process of obtaining proof sheets from a source that is remote or disconnected from his or her office. Additionally, presently available proof presses do not make an exact duplicate of the half-tone reproduction which will be generated by the final press. At best a simulation is made.

A more ideal proof press would be simple to use and inexpensive enough to be placed in the offices of the selectors of images. It would also be capable of producing high fidelity predictions of the appearance of a final output of a half-tone printing press.

Thermal printers are simple to use and have the capability of producing high fidelity images. However, thermal printers have heretofore been impractical for the production of large images that are required as proof sheets. Typically, the desired proof sheets are 22 inches by 17 inches.

In one type of thermal printer, a dye-donor element is placed over a dye-receiving element, and the superposed elements are supported for cooperation with a print head having a plurality of individual heating resistors. When a particular heating resistor is energized, it causes dye from the donor to transfer to the receiver. The density or darkness of the printed color dye is a function of the energy delivered from the heating element to the donor. One of the problems in printers of this type is that the thermal time constant of the resistors is quite long. As a result, the printing speed is relatively slow, and the image contrast is limited.

It is known to use lasers instead of the resistors to provide the thermal energy in thermal dye transfer printing. In U.S. Pat. No. 4,804,975, for example, there is shown thermal dye transfer apparatus which comprises an array of diode lasers which can be selectively actuated to direct radiation onto a dye-carrying donor. Radiation from the diode lasers is modulated in accordance with an information signal to form an image on a thermal print medium. The diode laser array extends the full width of the print medium. One problem with this apparatus is that it is too expensive for many applications. The initial cost of such a large array is relatively high, and failure of only one diode laser in the array will result in a discarding of the entire array. A further problem with the patented apparatus is that it is difficult to vary the half-tone dot pattern of the reproduced image.

It is desirable therefore to provide a proof printer which effectively illustrates image artifacts that are a function of interactions of the image a selected pattern of half-tone dots. It is particularly desirable to provide a proof printer that is sufficiently simple to be employed in a typical office setting.

SUMMARY OF THE INVENTION

The present invention is directed to a method and apparatus for printing a proof image on a receiver with a selected half-tone dot pattern. The proof image is formed with a series of incremental dots that are smaller than the half-tone dots. There is a suppression of printing artifacts that are a result of any beating or interaction of the incremental dots and the selected pattern of half-tone dots. The suppression of printing artifacts does not, however, mask any beating or interaction of image components (such as a picket fence) with the selected pattern of half-tone dots.

Viewed from one aspect, the present invention is directed to an apparatus for printing a proof set of an image in a preselected pattern of half-tone dots. The apparatus comprises means for transferring image media to a receiver in an array of incremental dots, each incremental dot being smaller than the half-tone dots, means for suppressing visual artifacts that are resultant from periodic interaction of the transferring means and the pattern of half-tone dots produced so that the artifacts are not visible to an unaided human eye. The suppressing means is adapted to preclude any masking of visual artifacts that are resultant from an interaction of the image and the preselected pattern of half-tone dots chosen for reproduction of the image.

Viewed from another aspect, the present invention is directed a method for printing a proof set of an image in a preselected pattern of half-tone dots. The method comprises the steps of transferring image media to a receiver in an array of incremental dots, each incremental dot being smaller than the half-tone dots and suppressing visual artifacts that are resultant from periodic interaction of the transferring means and the pattern of half-tone dots produced so that the artifacts are not visible to an unaided human eye. The suppressing step is performed to preclude any masking of visual artifacts that are resultant from an interaction of the image and the preselected pattern of half-tone dots chosen for reproduction of the image.

Other features and advantages will become apparent upon reference to the following detailed description when read in light of the attached drawings and claims.

BRIEF DESCRIPTION OF THE DRAWINGS

The drawings are not necessarily to scale.

DETAILED DESCRIPTION

Figure 1:
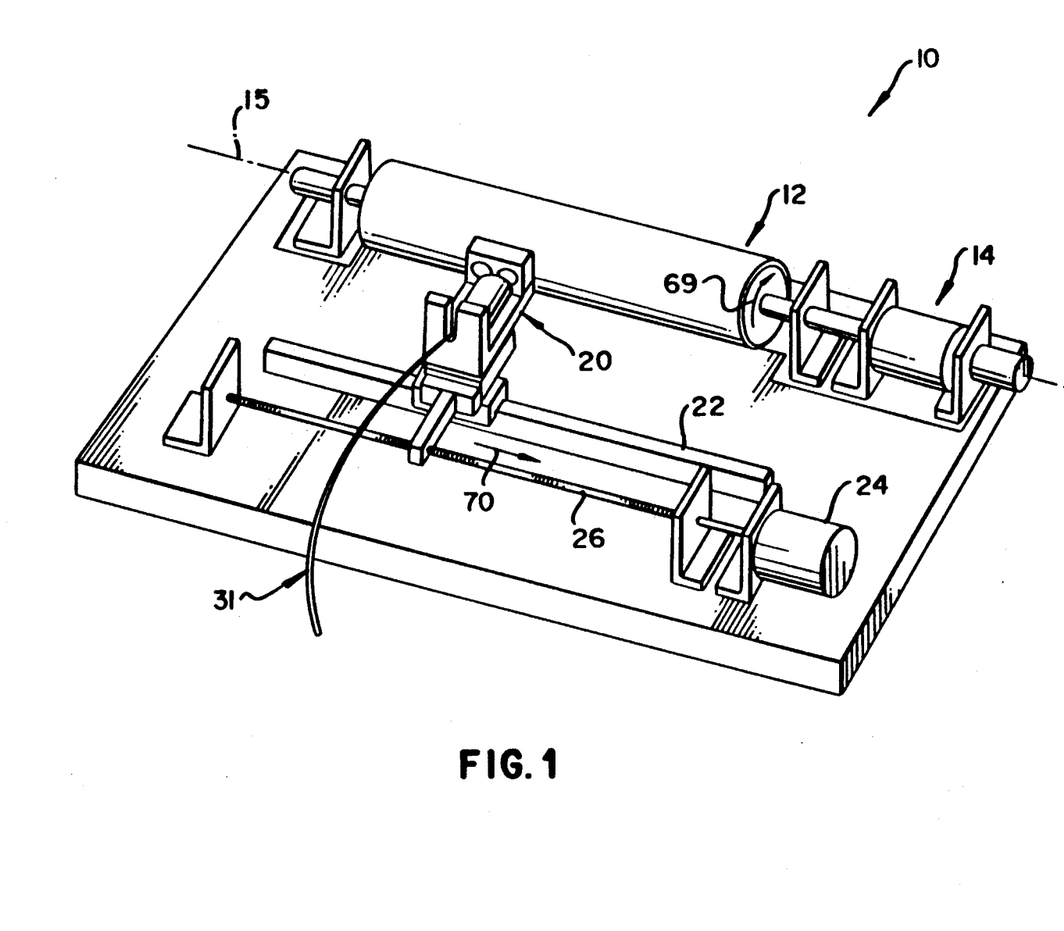
FIG. 1 is a perspective view of the thermal printer of the present invention.

With reference to FIG. 1, there is shown a thermal printer 10 constructed in accordance with the present invention. Printer 10 comprises a drum 12 which is mounted for rotation about an axis 15 and is driven by a motor 14. Drum 12 is a adapted to support a thermal print medium, not shown, of a type in which a dye is transferred by sublimation from a donor to a receiver as a result of heating the dye in the donor. A thermal print medium for use with the printer 10 can be, for example, a medium disclosed in U.S. Pat. No. 4,772,582, entitled "Spacer Bead Layer for Dye-Donor Element Used in Laser Induced Thermal Dye Transfer", granted Sep. 20, 1988. This patent is assigned to the assignee of the present invention.

As disclosed in U.S. Pat. No. 4,772,582, the thermal print medium includes a donor sheet having a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye or it may be admixed with the dye. The laser beam is modulated by electronic signals, which are representative of the shape and color of the original image, so that each dye is heated to cause volatilization only in those areas in which its presence is required on the receiver to reconstruct the color of the original object.

Figure 2:
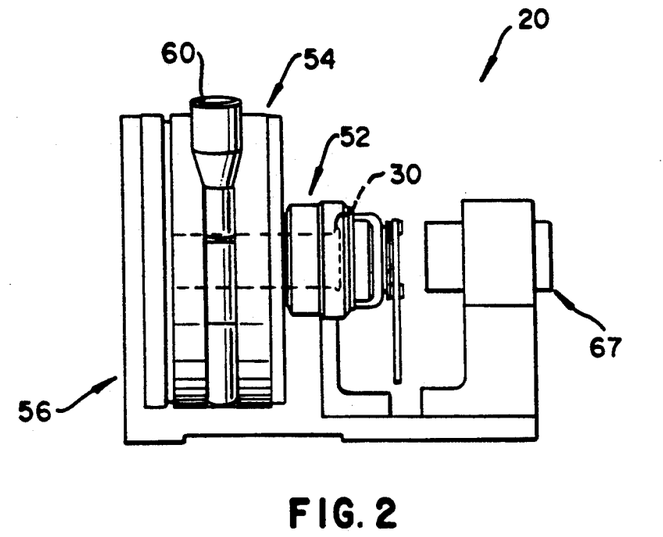
FIG. 2 is a side elevational view of the print head of the printer.
Figure 3:
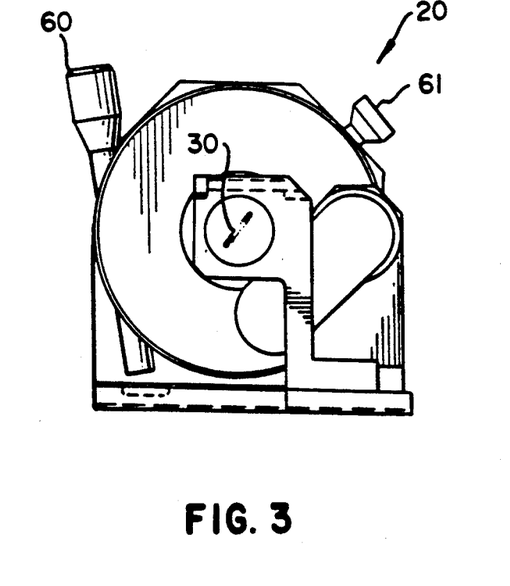
FIG. 3 is an end elevational view of the print head.
Figure 4:
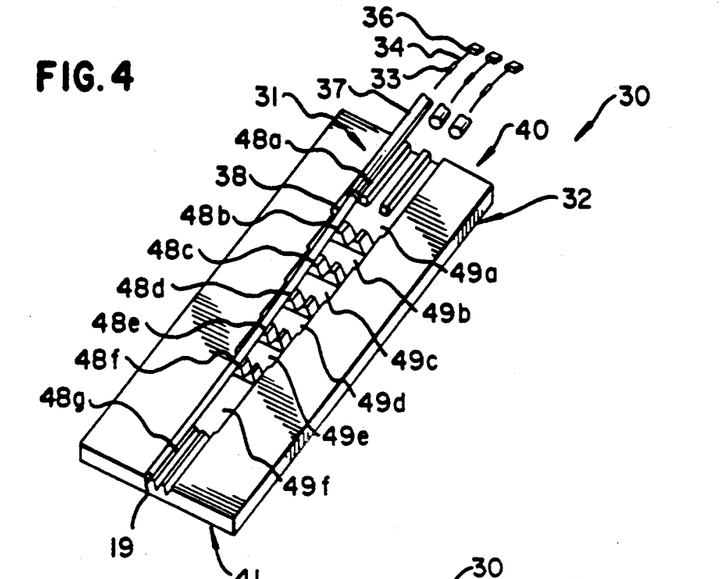
FIG. 4 is a perspective view of a fiber optic array suitable for use in the present invention.

A print head 20 is moveably supported adjacent the drum 12. Print head 20 is supported for slidable movement on a rail 22, and the print head 20 is driven by means of a motor 24 which rotates a lead screw 26. Print head 20 comprises a fiber optic array 30 (FIGS. 2–4). Optical fibers 31 in array 30 are connected to a plurality of diode lasers 36 which can be individually modulated to selectively direct light from the optical fibers onto the thermal print medium.

The array 30 can be of the type shown in FIG. 4. Array 30 comprises optical fibers 31 which are supported on a substrate 32. The full length of only one of the fibers 31 is shown in order to more clearly illustrate various features of the invention; it will be understood, however, that each of the fibers 31 is identical and extends the full length of substrate 32. Each of the fibers 31 is connected by means of an optical fiber connector 33 to another optical fiber 34. Optical fiber connector 33 can be of the type shown in U.S. Pat. No. 4,723,830, entitled "Optical Fiber Connectors", issued Feb. 9, 1988. Each optical fiber 34 is connected to a light source 36, such as a diode laser. A suitable diode laser can be, for example, a No. SDL-2430-H2, manufactured by Spectra Diode Labs, Inc., Ca. Each light source 36 in array 30 can be modulated according to an information signal in a well-known manner.

Figure 5:
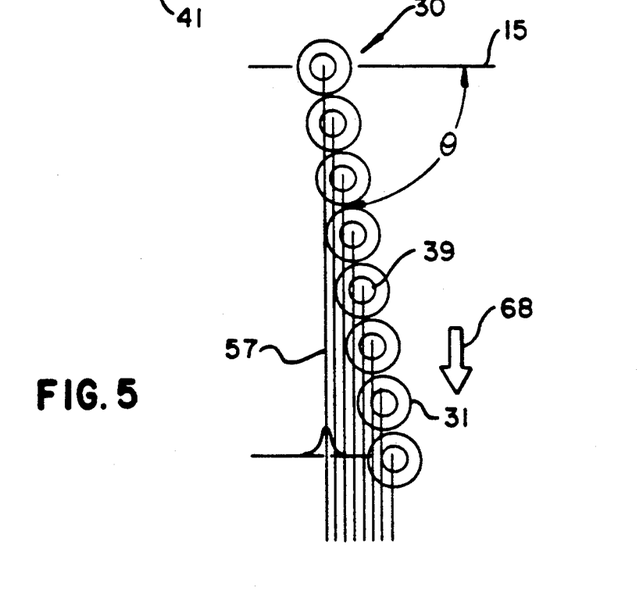
FIG. 5 is a diagram showing the spacing of successive lines of pixels for a particular angle of the print head.

Each of the optical fibers 31 includes a jacket 37, a cladding 38, and a core 39 (FIG. 5). Jacket 37 has been removed from a portion of the fiber to expose the cladding 38, and in a cladding end portion 19, the diameter of the cladding can be substantially reduced so that the end portions 19 can be more closely spaced relative to each other on substrate 32. A fiber suitable for use in the present invention is a multi-mode fiber, Fiber No. 16-100S, manufactured by General Fiber Optics, Inc., N.J..

As shown in FIG. 4, fibers 31 extend from an input end 40 of array 30 which supports jackets 37 of the fibers to an output end 41 of the array, and the fibers 31 are closest together at end 41. Fibers 31 are mounted in sets of grooves 48a–48g which are formed in substrate 32 and are separated by planar areas 49a–49g in the substrate 32. Grooves 48a are generally rectangular in cross section and grooves 48b–48g are generally V-shaped in cross section. In a preferred embodiment, the areas 49a–49f are coplanar with the bottoms of adjacent grooves. Although only three fibers 31 are shown in the array 30 in FIG. 4, it will be understood that any number of fibers 31 can be supported on the substrate 32. In a preferred embodiment of the array 30 for printer 10, the array includes 14 fibers. A more complete description of a suitable array and method of making such an array is disclosed in copending U.S. application Ser. No. 254,757, entitled "Method of Making a Fiber Optic Array", filed in the name of Keukeinen on Oct. 7, 1988.

As shown in FIGS. 2 and 3, array 30 is mounted in print head 20 for angular adjustment. Fiber optic array 30 is supported in a mounting ring 52 which is rotatably mounted in a collar 54. Collar 54 is fixed to a print head frame 56. An adjustment screw 60 is threadably mounted in collar 54 and bears against mounting ring 52 to provide for angular adjustment of the fiber optic array 30. A set screw 61 locks the array 30 in an adjusted position. A lens 67, supported on frame 56, is adapted to focus the ends of optical fibers 31 on the thermal print medium. It will be seen, with reference to FIG. 5, that the spacing between adjacent scan lines 57, formed by movement of the array 30 in the direction of arrow 68, can be adjusted by changing the angle theta.

In the use of printer 10, drum 12 would be driven in the direction of arrow 69 by motor 14. Each of the fibers 31 in print head 20 would be separately modulated in accordance with an information signal to produce a series of minipixels. During the printing process, print head 20 can be advanced continuously in the direction of arrow 70 so that helical scan lines (not shown) are traced on the thermal print medium supported on drum 12. Alternatively, during the time when no information is being written, print head 20 can be stepped the distance of one swath for each revolution of the drum 12 in order to trace truly vertical scan lines.

When the printer is used to produce a half-tone image, each pixel in the image is produced by 144 minipixels or incremental dots, and the diode laser 36 for each individual fiber is either on or off depending on the desired gray level. It will be seen that 144 different gray levels can be achieved in this manner. One method of controlling the minipixels to achieve different gray levels is disclosed in U.S. Pat No. 4,698,691.

Figure 6:
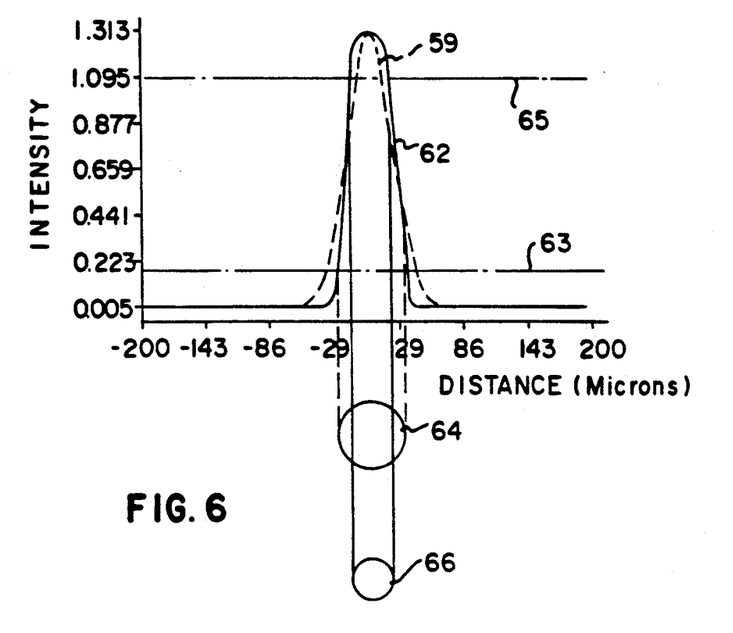
FIG. 6 is a diagram showing the focused beam profile and two different sizes of dots which are produced by two different speeds of the drum.

The incremental dot size produced by the printer 10 can be changed by adjusting thermal dye sublime threshold levels. With reference to FIG. 6, there is shown a focused beam profile 62 for an individual optical fiber. A Gaussian beam profile is indicated by the dotted line 59. It will be seen that, contrary to the usual case for focused laser light, the focused beam profile 62 is not a perfect gaussian. The thermal dye in the print medium requires a certain minimum energy to sublime. As a result, the thermal transfer starts at a certain power level which is known as the threshold power level for thermal dye transfer. If drum 12 is driven at a speed of, for example, 300 rpm, the threshold power level will be relatively low as indicated by the line 63 and the dot size will be relatively large as indicated by the dot 64. If the speed of the drum 12 is increased to, for example, 600 rpm, the threshold level will increase to the level indicated by the line 65, and the dot size will decrease as indicated by the dot 66. These dot sizes can also be achieved by changing the laser power; however, for many applications it is preferable to control the dot size by controlling the speed of the drum 12. The provision for the adjustment of the line spacing and the dot size makes thermal printer 10 a very versatile apparatus for use in digital scanning applications. Without major system parameter changes, a continuous tone print with a wide range of pixel densities as well as a half-tone image can be produced.

Figure 8:
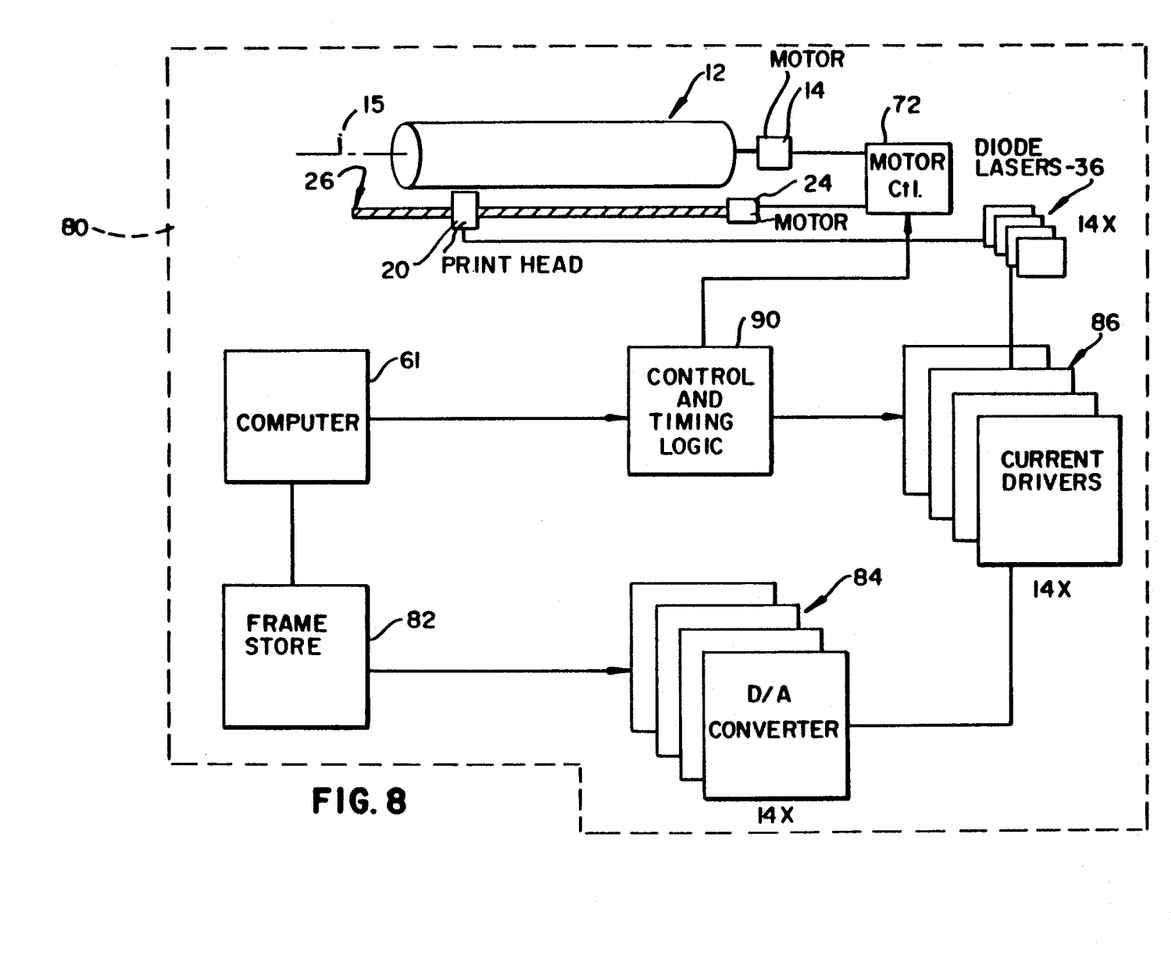
FIG. 8 is a block diagram of the electronic elements in the present invention.

A control system 80 for printer 10 is shown in FIG. 8. Control system 80 comprises a frame store 82 for storing image data received from an image scanner (not shown) or from an image storage medium (not shown). The data stored in frame store 82 includes, for example, three 8-bit values for each pixel, each value representing the red, green, or blue input for the pixel. Data from frame store 82 can be directed to image processing circuitry (not shown) in order to effect desired color corrections. The data is then delivered to digital-to-analog (D/A) converters 84, and the outputs from the D/A converters drive the voltage to current drivers 86 for the diode lasers 36. Microcomputer 61 provides overall control of the printer 10. Microcomputer 61 interfaces with control and timing logic 90 which is coupled to a motor control 72 for regulating the speeds of motor 14 for driving the drum 12 and motor 24 for driving the lead screw 26. Control and timing logic 90 also provides signals to current drivers 86 to modulate diode lasers 36 in timed relation with the movement of drum 12 and print head 20.

In the use of the disclosed print head 20, the line spacing, and thus the ratio of dot overlap, can be changed by adjusting the angle theta (FIG. 5) which is the angle of the print head 20 relative to the axis 15 of drum 12. Two significant thermal effects of the dye transfer process result when print head 20 is disposed at an angle as shown in FIG. 5. One effect is that the amount of dye transferred is significantly increased which results in darker lines. This effect of increased dye transfer is due to preheating of dye in a particular line by a diode laser in an adjacent line so that the laser energy is more efficiently used in the dye transfer process. Because of this preheating of the dye, the writing speed can be increased.

A second effect of the disclosed print head arrangement; however, is that the two outer scan lines do not receive as much thermal energy as the inner scan lines. As a result, the two outer scan lines are much narrower, by about one half of the inner scan line width, since these minipixels are much smaller. This is a source of visual density difference. Also, because of these two narrowed outer scan lines, there is a gap between adjacent swaths of scan lines, even though the print head 20 is advanced at the proper interval. This is known as interswath defect. This difference of line width between the outer scan lines and the remainder of the scan lines creates a banding artifact. Since it takes 12 minipixels to write a half-tone dot, and the printing swath sometimes may be less than 12 minipixels wide, the interswath defect comes at a different section of each sequential half-tone dot, and thus cycles across the image. The interswath defect frequency beats with the half-tone dot frequency, and is visually observed in the image as banding. The resulting density variation has a spatial frequency in the image which, unfortunately, matches with the eye's greatest contrast sensitivity.

In the printer 10, care is taken to assure that each line of the swath is generated with equal image density. A failure to achieve equal image density on each line may result in an image in which the swaths beat against a selected half-tone dot pattern and produce an undesirable image artifact known as banding. This banding phenomenon is most likely to occur when the half-tone dot pattern corresponds to an even multiple of the swath width.

For example, the printer 10 produces an image with a swath width of 12 lines at a resolution of 1800 lines per inch. Thus, it has been found difficult to print half-tone patterns with a screen ruling of 133 dots per inch and a screen angle of 7.5 degrees. This can be explained by recognizing that the swath frequency is 1800/12 or 150 swaths per inch. The screen ruling in the direction perpendicular to the swath is 133/cos(7.5), or 134 dots per inch. This produces a beat frequency of 150−134 or 16 cycles per inch. This beat frequency is easily seen by a normal human eye because it is close to the peak in the eye's sensitivity (i.e., about 25.4 cycles per inch at a 10 inch viewing distance).

The phenomenon of banding can be reduced by changing a number of parameters. Obviously, a user of the printer 10 can change the screen ruling and angle of the half-tone dots to a combination that does not beat against a resolution of 1800 incremental dots per inch and 12 line swaths. But such a change would reduce the usefulness of the printer 10 in the context of its use as a proof printer of half-tone images. If the expected final printing of the image in a publication is to be performed with a screen ruling of 133 dots per inch and a screen angle of 7.5 degrees, then a proof press must be capable of producing half-tone dots at that combination. Otherwise, the proof press would not be effective in illustrating any image artifacts that result from image components (such as picket fences) beating against the particular half-tone dot pattern.

Figure 7:
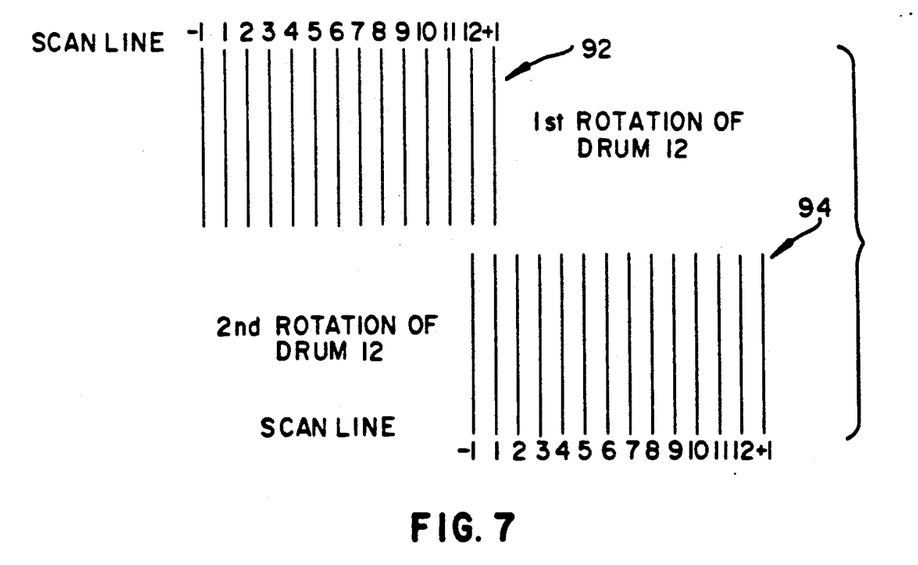
FIG. 7 is a diagram illustrating the scan lines formed by successive passes of the print head.

In order to overcome the problem of banding discussed in the preceding paragraph, two so-called dummy channels are used in the print head 20. The two dummy channels include the two outside optical fibers 31 in print head 20. The two dummy channels produce dummy scan lines which are not used for actual writing, but rather for preheating and postheating of inner scan lines. The scan lines for a first swath 92 and for a second swath 94 are shown in FIG. 7. The two dummy scan lines are designated (−1) and (+1), and the writing scan lines are designated (1)-(12). It will be seen that the dummy scan line (−1) of the second swath 94 overlaps the writing scan line (12) of the first swath 92, and that the writing scan line (1) of the second swath 94 overlaps the dummy scan line (+1) of the first swath 92.

There are several different ways of using the dummy scan lines (+1) and (−1) for heating in order to achieve desired image quality. It will be understood that the dummy channels are always maintained below full power, and power to the dummy channels can be, for example, about 33% of full power. One way of using the dummy channels is for the two dummy channels (+1) and (−1) to write at a constant laser power level near the threshold point of dye transfer; in many applications, this makes the density variation between swaths not visible.

A second way of using the dummy channels can be employed in which the data fed to the line (−1) in a given swath is the result of a logical "AND" operation between the data of the line (12) in the preceding swath and the data of the line (1) of the given swath, minipixel by minipixel, and data fed to the (+1) line in a given swath is the result of a logical "AND" operation between the data of the line (12) of the given swath and the data of line (1) of the next swath, minipixel by minipixel. Thus, for example, with reference to FIG. 7, data for the line (−1) in second swath 94 would be the result of a logical "AND" operation between data in line (12) in the first swath 92 and data in line (1) in swath 94; and data for the line (+1) in swath 94 would be the result of a logical "AND" operation between data for line (12) in swath 94 and the data in line (1) of a next swath (not shown). In utilizing the "AND" operation, if the previous line (12) was off at a given minipixel, and the corresponding line (1) minipixel is full on, then the line (−1) (preheat) will be turned off over the line (12) site, resulting in a smaller line 1 pixel. These localized minipixel size changes are less visually noticeable than the banding. It will be seen from the foregoing that, with the use of dummy channels, the formation of each half-tone dot is not distorted due to the interswath defect.

Figure 9:
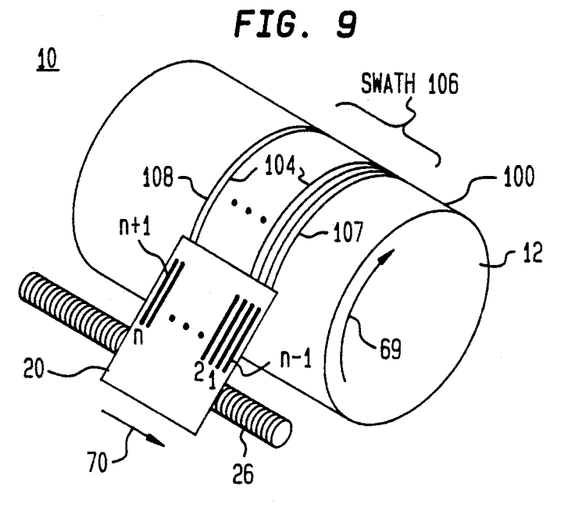
FIG. 9 is a schematic representation of the printer of FIG. 1 showing an inventive operational feature thereof.

Referring now to FIG. 9, there is shown in schematic form certain elements of the printer 10, of FIG. 1, that show another way of viewing the inventive operational features of the printer 10 identified with numbers that correspond to those used in FIG. 1. These elements comprise the drum 12 mounted for rotation in the direction indicated by the curved arrow 69. The print head 20 is shown mounted on the lead screw 26 for lateral motion in the direction of the arrow 70 parallel to a cylindrical surface 100 of the drum 12. The rotation of drum 12 in the direction of the arrow 69 is termed the "fast scan" direction and the lateral movement of the print head 20 in the direction of the arrow 70 is termed the "slow scan" direction. The print head 20 contains a number of laser channels "1" through "n" and two outside (dummy) channels "n−1" and "n+1". Each of the laser channels "n−1" through "n+1" provides a very small spot (e.g., about 20 microns dia.) of light energy focused on the dye donor element (not shown) on the drum 12.

As the drum 12 rotates and the individual laser channels 1" through "n" are energized with print or line data corresponding to image data of a picture being printed, the respective laser channels print through the dye donor element (not shown) closely spaced lines of micro-pixels on a receiving element (not shown) mounted on the drum 12, as previously explained. These closely spaced image lines, indicated at 104, form what has been described hereinabove a "swath". A single such swath 106 is shown for the sake of illustration in FIG. 9 greatly enlarged and not to scale. It is to be understood that the lines 104 of each swath 106 are very close together (e.g., 1800 lines per inch) and that there are as many swaths 106 contiguously side-by-side as required by the image being printed. The two outside "dummy" lines printed by the dummy laser channels "n−1" and "n+1" are indicated at 107 and 108, respectively. The effect of these "dummy" lines 107 and 108, and the elimination of visual seam lines between successive swaths 106 will be described hereinbelow. It is to be further understood that as an image is rapidly printed along a swath 106 in the fast scan direction (arrow 69), the swath 106 shifts slowly laterally in the slow scan direction (arrow 20) because of the lateral motion of the print head 2 imparted by the leadscrew 26. At the end of a revolution of the drum 12, one swath 106 ends and another swath 106, which is precisely aligned to the first, begins. Thus all of the swaths 106, when printing is finished, comprise a visually seamless image.

Figure 10A:
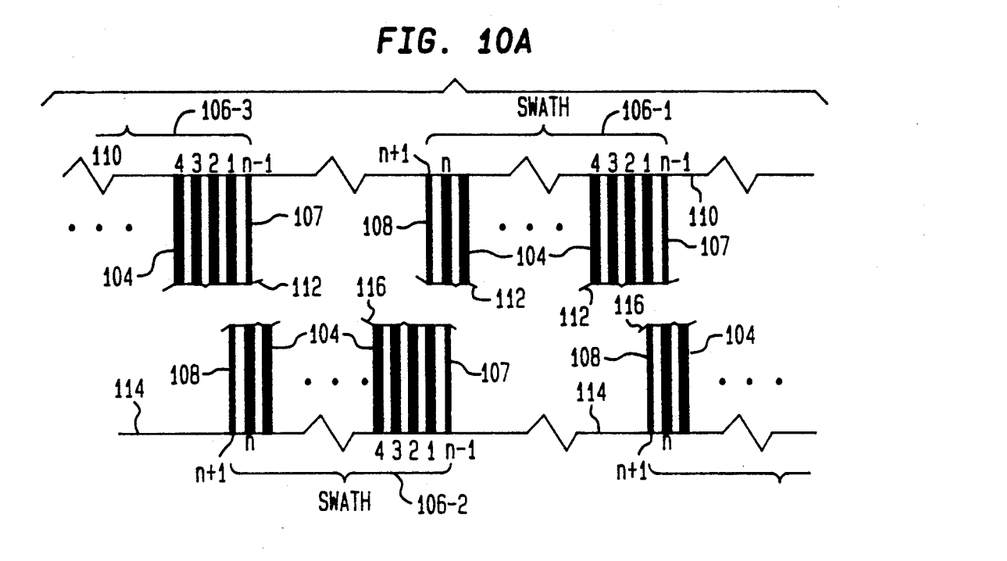
FIG. 10A is a schematic representation of multiple print lines printed as sequential swaths in accordance with the invention.

Referring now to FIG. 10A, there is schematically shown how the swaths 106, along with their respective image lines 104 and the dummy lines 107 and 108, are written side-by-side so that there is no visible seam line between the swaths. The swaths are shown here very greatly enlarged, not to scale, and partially broken away for the sake of illustration. It is to be understood that the image lines 104 (shown solid to illustrate a continuous tone mode of operation of the printer 10) respective to the channels "1" through "n", and here so identified, are actually a series of micro-pixels printed closely together along each line 104 in accordance with the line image print data supplied to each laser channel "1" through "n". Moreover, the lines 104 are actually so close together that the eye cannot see any "blank" or unprinted spaces between them. Dummy lines 107 and 108 have less printed density, as was explained previously, and are shown here as slightly narrower than the image lines 104. In the absence of the dummy lines 107 and 108 (lines "n−1" and "n+1") the image lines "1" and "n" would be less dense (in the illustration here they would be less thick). This would result in undesirable visual seam lines between the swaths, as explained above.

As seen at the upper right of FIG. 10A, the image lines 104 of a first swath 106-1 begin at an upper picture edge 110 and proceed vertically downward. The swath 106-1 is shown broken away along a break-line 112 for the sake of illustration, but it is to be understood that the swath 1061 in fact extends downward to a lower picture edge 114. The distance between the upper and lower picture edges 110 and 114 may in fact be almost equal to the circumference of the drum 12 (e.g., about 20 inches). To the left and below the portion of the swath 106-1 which is not broken away, is a second swath 106-2, the upper portion of which is shown broken away along a break-line 116. Thus it can be seen that the dummy line 107 (line "n−1") of the second swath 106-2 is printed on top of the last image line 104 (line "n") of the previous swath 106-1. Similarly, the first image line 104 (line "1") of the second swath 106-2 is printed on top of the dummy line 108 (line "n+1") of the first swath 106-1. Similarly, the last image line 104 (line "n") and dummy line 108 (line "n+1") of the second swath 106-2 are over-printed by the respective lines of a third swath 106-3, and so on. The swath 106-1 is shown as being preceded by an earlier swath (only part of which is shown). However, where a swath is the first or initial one printed, the first dummy line 107 (line "n−1") of the first-to-be-printed swath is not printed.

Figure 10B:
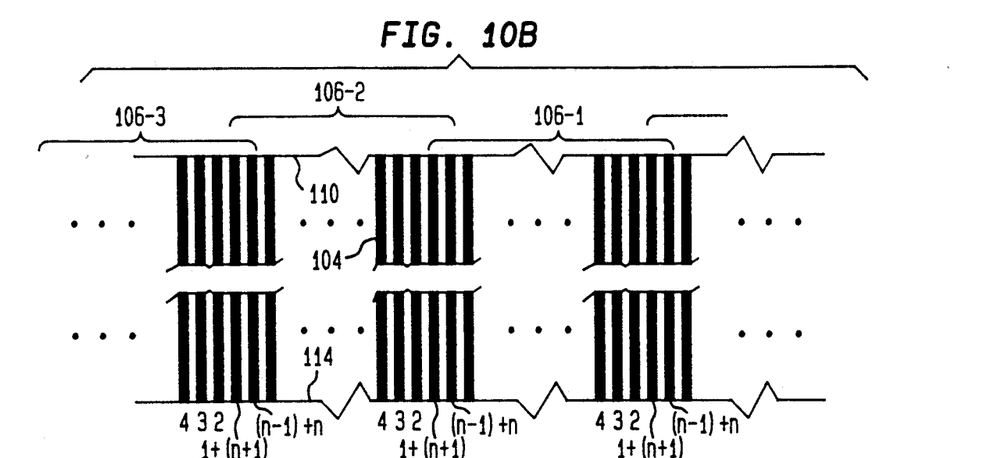
FIG. 10B shows how the individual swaths of FIG. 10A are blended into a continuous succession of swaths, without visual printing artifacts, in accordance with the invention.

Referring now to FIG. 10B, the sequential swaths 106-1, 106-2 and 106-3 are shown here with their initial and ending image lines 104 (lines "1" and "n") now combined with their respective dummy lines 107 and 108. This is indicated by the lines "n−1" and "n" lying on top of each other, and the lines "1" and "n+1" lying on top of each other. The net effect of this is to eliminate visual "seam lines" between the adjacent swaths. To emphasize this result all of the lines of the swaths 106-1, 106-2 and 106-3 are shown here as having equal densities and spacings. Only the beginning upper and ending lower portions of the contiguous swaths 106 are shown in FIG. 10B; the center portions are shown broken away because of the extreme length of the swaths relative to the scale of the illustration. If the dummy lines 107 and 108 (lines "n−1" and "n+1") were not present, that is, not combined with image lines "n" and "1" respectively, as shown here in FIG. 10B, the image lines "n" and "1" would be less dense, and hence visually objectionable seam lines (printing artifacts) between the swaths 106 would occur.

This suppression or elimination of printing artifacts makes the printer 10 particularly useful as a half-tone proof printer. When the printer 10 functions as a proof printer of half-tone reproductions, it utilizes the above described technique to suppress any beating of the incremental dots that form a printed image with the pattern of half-tone dots selected for a proof image. In this mode of operation, there is no interference with the proofing function of the printer 10. The desired half-tone screen pattern is used to produce a proof image. Any image artifacts which are associated with interactions between the image and the selected half-tone dot pattern are left to display themselves. However, there are no visible artifacts that are introduced by the interaction of the incremental dot pattern generated by the printer 10 and the half-tone dot pattern selected by the user of the printer 10.

Figure 11:
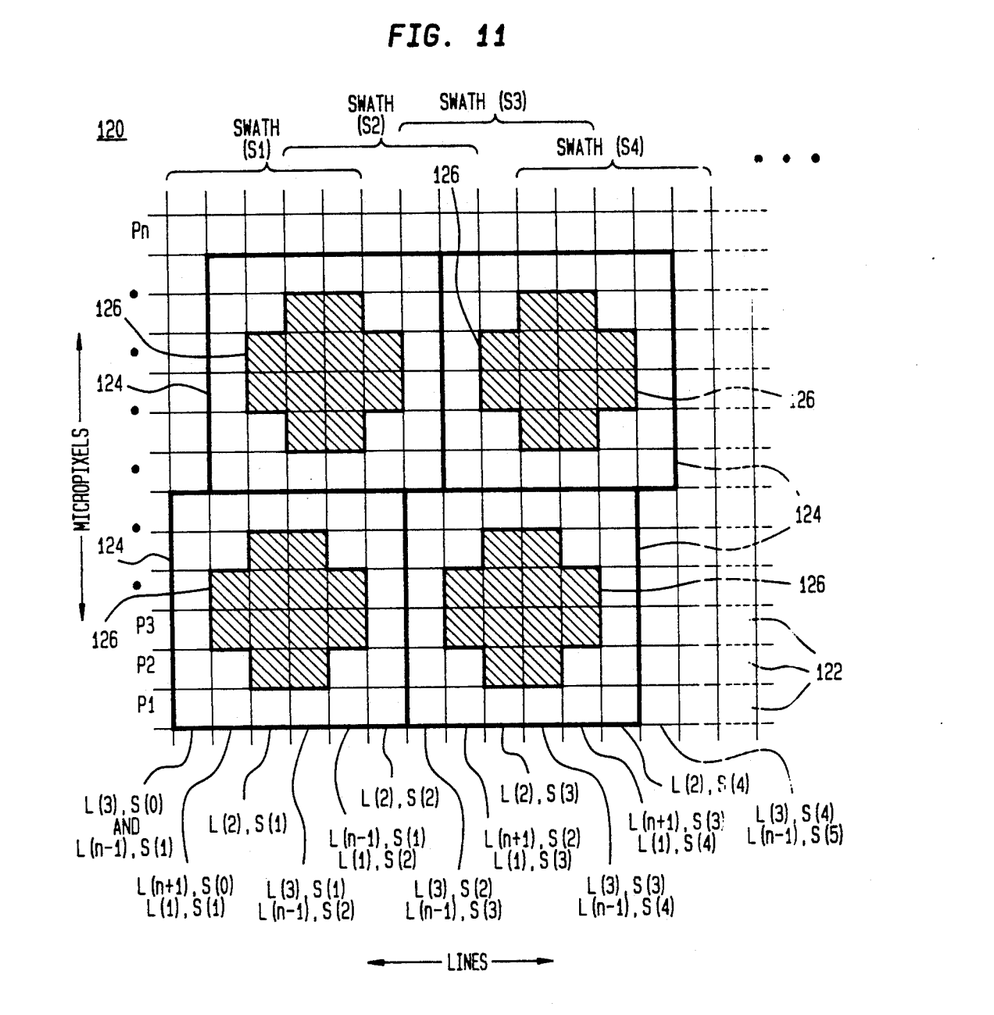
FIG. 11 is a symbolic drawing of a portion of a half-tone image in a format that is produced by the printer of FIG. 1 in accordance with the invention.

Referring now to FIG. 11 there is shown symbolically a region (segment) 120 of an image generated by the printer 10. FIG. 11 illustrates how the printer 10 of FIG. 1 generates a half-tone image without masking any visual artifacts that are resultant from an interaction of the image and a preselected pattern of half-tone dots chosen for reproduction of the image.

The segment 120 is a portion of a half-tone reproduction. For purposes of clarity, swaths are shown in FIG. 11 as being only five lines wide. The segment 120 is comprised of areas 122. Each of the areas 122 has an identifiable location determined by a line number and a micropixel number. The lines have a vertical orientation and the micropixels have a horizontal orientation in FIG. 11.

Certain collections of the areas within the segment 120 are designated as half-tone dot cells 124. As shown, each of the cells 124 comprises thirty six of the areas 122 (a six by six matrix). The exact size and spacing of these half-tone dot cells 124 is determined when a particular screen ruling and screen angle are chosen by an operator of the printer 10. Within each of the half-tone dot cells 124 there is a shaded area that represents a half-tone dot 126. Each half-tone dot 126 is formed when a selected number of the areas 122 is marked with dye during the printing process. In that context, each of the areas 122 marked with dye can be considered as an incremental dot, and the image can be considered to be comprised of a collection of incremental dots. Twelve of the thirty six areas 122 in each of the cells 124 is marked with dye. Consequently, each of the cells 124 can be considered to contain a 33% half-tone dot.

The example of FIG. 11 illustrates a case in which an image is generated in a series of swaths that are five lines wide. The swaths are identified as S(1), S(2), S(3) and S(4) at the top of FIG. 11. The lines that comprise the swaths are identified at the bottom of FIG. 11. A line on the extreme left hand side of FIG. 11 is identified as L(3), S(0) and L(n−1), S(1). This signifies that this lefthandmost line is the last line of a previous swath S(0) (not shown) and a first dummy line L(n−1) of the first swath S(1). The next line to the right of L(3), S(0) is designated L(n+1), S(0) and L(1), S(1). This signifies that it is the last dummy line of the previous swath S(0) and the first writing line of the first swath S(1). The next line to the right is designated L(2), S(1). This signifies that this line is the second writing line of the first swath S(1) and has no dummy line component. The fourth line to the right is designated L(3), S(1) and L(n−1), S(2). This signifies that the fourth line is the last writing line of the first swath S(1) and the first dummy line of the second swath S(2). All of the other lines are designated similarly to illustrate the relationships of each line to its own swath and to adjacent swaths.

When the inventive use of dummy lines is employed to produce a half-tone proof, any heating of the incremental dots against any half-tone pattern is suppressed below a humanly visible threshold. There is, however, no masking of any beating that results from image components (such as picket fences) beating against a half-tone dot pattern that may be selected by an operator of the printer 10 for a particular proof. Thus an operator of the printer 10 is able to clearly see the effect of a particular choice of half-tone pattern on the quality of a final reproduced image in a publication.

It is to appreciated and understood that the specific embodiments of the invention are merely illustrative of the general principles of the invention. Various modifications may be made by those skilled in the art which are consistent with the principles set forth. For example, the present invention is useful on any proof printers which generate half-tone dot patterns with incremental dots or minipixels.

What is claimed is:

1. Apparatus for printing a proof set of an image by laser induced dye transfers in a preselected pattern of half-tone dots, the apparatus comprising:

means for transferring image media to a receiver in an array of incremental dots, said incremental dots being transferred to said receiver as a series of swaths of parallel lines with each line in the swath being generated substantially simultaneously, each swath having a plurality of inner lines and at least one outer line that overlaps the swath adjacent thereto, said transferring means comprising an array of individual lasers, each of said lasers being capable of generating one of the lines in the swath, and driver means for supplying a current to each of said lasers;

said driver means supplying a first current to the inner lasers which is modulated in accordance with an information signal for writing on a print medium and a second current to the outer laser at less than full power for heating the dye of the outer line of the swath to suppress visual artifacts that are resultant from periodic interaction of the transferring means and the pattern of half-tone dots produced so that the artifacts are not visible to an unaided human eye without masking visual artifacts that are resultant from an interaction of the image and the preselected pattern of half-tone dots chosen for reproduction of the image.

2. The apparatus of claim 1 wherein the first current is above a threshold amount and the second current is below the threshold amount and said threshold amount of current produces energy in a dye donor medium of an intensity near a threshold point of dye transfer.

3. The apparatus of claim 1 wherein the second current is applied to lasers that effect the formation of first and last lines in a swath.

4. The apparatus of claim 3 wherein the first current is applied to the lasers that effect the formation of the scan lines between the first and last lines of a swath.

5. The apparatus of claim 3 wherein an information signal to said first line in a given swath is a result of a logical AND operation between an information signal to the laser which produced the next-to-last line in an immediately preceding swath and an information signal to the laser which produces the next adjacent line in the given swath.

6. The apparatus of claim 5 wherein an information signal to said last line in a given swath is a result of a logical AND operation between an information signal to the laser which will produce the second line in the swath after said given swath and an information signal to the laser which produces the next adjacent line in the given swath.

7. A method for printing a proof set of an image by laser induced dye transfer in a preselected pattern of half-tone dots comprising the steps of:

transferring image media to a receiver in an array of incremental dots, each incremental dot being smaller than the half-tone dots and being transferred to the receiver as a series of swaths of parallel lines with each line in the swath being generated substantially simultaneously and with each swath having at least one outer line that overlaps the swath adjacent thereto;

said transferring steps being performed with an array of individual power sources, each power source being capable of generating one of the lines in the swath, and the array comprising inner and outer power sources;

suppressing visual artifacts that are resultant from periodic interaction of the transferring means and the pattern of half-tone dots produced so that the artifacts are not visible to an unaided human eye without masking visual artifacts that are resultant from an interaction of the image and the preselected pattern of half-tone dots chosen for reproduction of the image by:

supplying a first current to the inner power sources and modulating said first current in accordance with an information signal for writing; and supplying a second current to the outer power source less than full power for heating the dye of the outer line of the swath.

8. The method of claim 7 wherein the first current is above a threshold amount and the second current is below the threshold amount and said threshold amount of current produces energy in a dye donor medium of an intensity near a threshold point of dye transfer.

9. The method of claim 8 wherein the second current is applied to lasers that effect the formation of first and last lines in a swath.

10. The method of claim 9 wherein the first current is applied to the lasers that effect the formation of the lines between the first and last lines of a swath.

11. The method of claim 9 wherein an information signal to said first line in a given swath is a result of a logical AND operation between an information signal to the laser which produced the next-to-last line in an immediately preceding swath and an information signal to the laser which produces the next adjacent line in the given swath.

12. The method of claim 11 wherein an information signal to said last in a given swath is a result of a logical AND operation between an information signal to the laser which will produce the second line in the swath after said given swath and an information signal to the laser which produces the next adjacent line in the given swath.

* * * * *